No. 884,298. PATENTED APR. 7, 1908.
G. L. & A. SCHAEFER.
PROCESS OF PREPARING CUPRAMMONIA SOLUTION.
APPLICATION FILED JUNE 5, 1907.
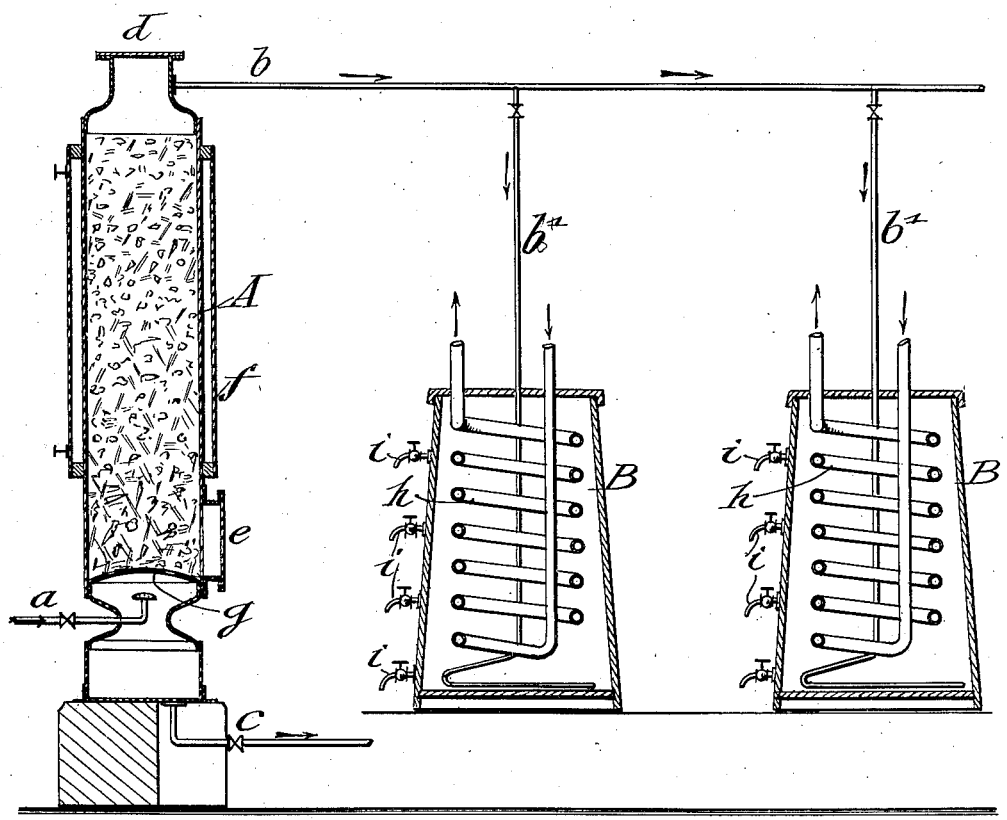

UNITED STATES PATENT OFFICE.

GEORGE L. SCHAEFER, OF NEW YORK, N. Y., AND AUGUST SCHAEFER, OF BASEL, SWITZERLAND.

PROCESS OF PREPARING CUPRAMMONIA SOLUTION.

No. 884,298.  Specification of Letters Patent.  Patented April 7, 1908.

Application filed June 5, 1907. Serial No. 377,478.

*To all whom it may concern:*

Be it known that we, GEORGE L. SCHAEFER, a citizen of the United States, residing in New York, in the borough of Brooklyn, county of Kings, and State of New York, and AUGUST SCHAEFER, a citizen of the Empire of Germany, residing in Basel, in the Confederation of Switzerland, have invented certain new and useful Improvements in Processes of Preparing Cuprammonia Solutions, of which the following is a specification.

This invention relates to an improved process of making ammoniacal solutions of cupric hydroxid for dissolving cellulose preparatory to producing silklike threads from cellulose such as cotton, wood fibers, unsized paper, etc., dissolved in said solutions.

It is well known that cellulose can be dissolved in different ways, but in most cases the cellulose undergoes a complete chemical transformation, so that the regaining of the starting material is impossible. In many cases the solutions employed for dissolving the cellulose are not properly prepared and the conditions requisite thereto not fully carried out, so that the cost of the solvent becomes either too great or that a final product with the required property is not obtained at all.

We have found that an ammoniacal solution of cupric hydroxid obtained by our improved process gives absolutely good and reliable results; and for this purpose the invention consists of a process of preparing an ammoniacal solution of cupric hydroxid which is obtained in the following manner: In our improved process the ammoniacal solution of cupric hydroxid is made in the usual manner, that is to say, by subjecting copper-chips in a suitable tower to the action of ammonia-water and a current of air, or, in place of air, of pure oxygen. We have discovered that when the ammoniacal solution of cupric hydroxid is made at an alternating-changing temperature, a solution is obtained which contains a higher percentage of copper than when making the solution at ordinary temperature. We have discovered further that when temperatures between $-4°$ C. and $+8°$ C. are used and the temperature is continually changed so as to rise and fall while the air or oxygen is passing through the solution, a superior solvent is obtained.

In the accompanying drawing is shown a vertical longitudinal section of an apparatus for making an improved ammoniacal solution of cupric hydroxid. For this purpose a tower similar to a drying-tower is used.

A represents the generator for the ammoniacal solution of cupric hydroxid, $a$ the pipe for supplying the current of air, $b$ the outlet-pipe for the air, $c$ the outlet-pipe for the ammoniacal solution of cupric hydroxid, $d$ the charging-opening at the upper end of the generator, $e$ the outlet for emptying the generator, $f$ the cooling-jacket, $g$ a perforated false-bottom for distributing the air in the generator, and B one or more wooden tanks in which cooling-coils $h$ are located that keep the solution at a temperature between 0 and 6° C.

The air supplied by the pipe $a$ is distributed by the perforated false-bottom $g$ and conducted in upward direction through the copper-chips and ammonia-water in the generator and passes then through the pipe $b$ at the upper end of the generator to the absorbing-tanks, being rich in ammonia-vapors which are carried along by the same. The air-outlet pipe $b$ is connected by downwardly-extending pipes $b^1$ with the interior of the tanks B which contain a solution of cupric sulfate, which solution is kept at a temperature between 0 and 6° C. by the cooling-coils $h$. The supply of ammonia-vapors is continued until the liquid has absorbed about 4% of ammonia. Each tank B is provided with a number of faucets $i$, located at different levels one above the other, so as to draw off the solution of cupric compounds. This solution, which consists of cupric sulfate which is partly converted into its hydrate, is then intimately mixed with an ammoniacal solution of cupric hydroxid taken from the generator, and to this mixture a lye of sodium or potassium hydrate is added in such a quantity as was required for the complete hydratization of the cupric sulfate, the quantity of which has to be determined in every case before the two liquors are mixed together. A good effective solution is so determined that for about 8 to 12% of ammonia 45 to 50 grams of copper are contained in every liter of the solution. The solution is now stirred for a few minutes in a suitable mixing-vessel, after which the previously-treated cellulose is placed in the same. A solution obtained in this manner can dissolve cellulose in the proportion of 1 part cellulose to 8 or 8.5 parts of the solution. The complete dissolution of cellulose requires, under continuous stirring, from about seven to nine hours, and during this time care has to be taken that the temperature is kept constantly below 1° C. The solution thus obtained is perfectly clear, has a deep dark blue color and flows freely and may readily be converted into threads.

Having thus described our invention, we claim as new and desire to secure by Letters Patent:

1. The process herein described of preparing an ammoniacal solution of cupric hydroxid, which consists in subjecting copper-chips to the action of air and ammonia at a temperature changing alternately between −4° and +8° C.

2. The process herein described of preparing a concentrated ammoniacal solution of cupric hydroxid, which consists in subjecting copper-chips to the action of air and ammonia at an alternately changing low temperature, and mixing the ammoniacal solution of cupric hydroxid with cupric sulfate and an alkali lye so that a proper molecular quantity of copper and ammonia is obtained in the solution.

In testimony, that we claim the foregoing as our invention, we have signed our names in presence of two subscribing witnesses.

GEORGE L. SCHAEFER.
AUGUST SCHAEFER.

Witnesses as to the signature of George L. Schaefer:
 PAUL GOEPEL,
 HENRY J. SUHRBIER.

Witnesses as to the signature of August Schaefer:
 ADOLPH FISCHER,
 ARTHUR SCHURZ.